Patented Sept. 15, 1953

UNITED STATES PATENT OFFICE 2,652,403

2,652,403
PROCESS OF PREPARING m-NITRO AND m-AMINOBENZYL DERIVATIVES OF α-MONO- AND α,α'-DIKETO-PYRROLIDINES AND -PIPERIDINES AND TETRAHYDROPHTHALIMIDES

Saul R. Buc, Easton, Pa., assignor to General Aniline & Film Corporation, New York, N. Y., a corporation of Delaware No Drawing. Application December 30, 1949, Serial No. 136,166

5 Claims. (Cl. 260—326)

This invention relates to m-nitro and m-aminobenzyl derivatives of the α-mono- and α,α'-diketo-pyrrolidines and -piperidines, and -tetrahydrophthalimide, and to a process of preparing the same.

I have found that substituted and unsubstituted nitrobenzenes, in which one of the meta-positions to the nitro group is unoccupied, readily react with formaldehyde or a formaldehyde-yielding substance and with α-mono- or α,α'-diketo-pyrrolidines and -piperidines or tetrahydrophthalimide in the presence of concentrated sulfuric acid to give compounds which on reduction yield amines valuable as dye intermediates.

It is an object of the present invention to provide substituted and unsubstituted m-nitrobenzyl derivatives of α-mono- and α,α'-diketopyrrolidines and -piperidines, and tetrahydrophthalimide.

A further object is to provide a process of preparing said derivatives and corresponding amines of said derivatives.

Further objects and advantages will appear hereinafter.

The above objects and other advantages are accomplished in accordance with the present invention by condensing formaldehyde or a formaldehyde-producing compound, such as paraformaldehyde, with any substituted or unsubstituted nitrobenzene having at least one unoccupied position meta to the nitro group, and with an α-mono- or α,α'-diketo-pyrrolidine, -piperidine, or tetrahydrophthalamide in the presence of concentrated sulfuric acid.

The compounds obtained by the foregoing process are characterized by the following formulae:

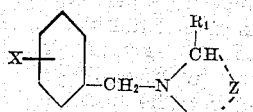

and

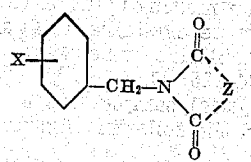

wherein $R_1$ represents either hydrogen or a methyl group, X represents $NH_2$ or $NO_2$, Z represents the acyclic or alicyclic hydrocarbon radicals necessary to complete a cyclocarboimide ring and wherein X occupies a position meta to the $—CH_2—$ radical, and the remaining positions in the benzene ring are occupied either by hydrogen, hydroxy, or an alkyl group, such as methyl, ethyl, propyl, butyl, isopropyl, and the like, alkoxy, such as methoxy, ethoxy, propoxy, butoxy, halogen, e. g., bromine, chlorine, carboxylic acid, sulfonic acid, and the like.

The group or groups present in the benzene ring of the substituted nitrobenzene is immaterial so long as one of the meta-positions to the nitro group is unoccupied. As representtive of substituted nitrobenzenes which are employed in the condensation reaction, the following may be mentioned:

m-Chloronitrobenzene
o-Chloronitrobenzene
p-Chloronitrobenzene
p-Nitrotoluene
2,3-dichloro-1-nitrobenzene
2-chloro-p-nitrotoluene
3-chloro-p-nitrotoluene
2,3-dichloro-p-nitrotoluene
2,5-dichloro-p-nitrotoluene
p-Nitro-tert.-amylbenzene
o-Nitrotoluene
m-Nitrotoluene
2-nitro-m-xylene
4-nitro-m-xylene
4-nitro-o-xylene
3-nitro-p-xylene
4-nitro-p-xylene
p-Nitroanisole
o-Nitroanisole
p-Nitrophenetole
o-Nitrophenetole
5-chloro-2-nitroanisole
2-chloro-3,4-dinitrophenetole
5-chloro-2-nitrotoluene
6-chloro-2-nitrotoluene
4-chloro-3-nitrotoluene
6-chloro-3-nitrotoluene
4,5-dichloro-2-nitrotoluene As representative of the α-mono- and α,α'-diketopyrrolidines and -piperidines and tetrahydrophthalimide, which are condensed with any one of the aforestated substituted and unsubstituted nitrobenzenes, reference may be made to the following:

(1)

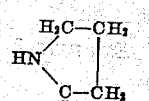

γ-Butyrolactam (2)

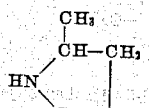

γ-Valerolactam (3) 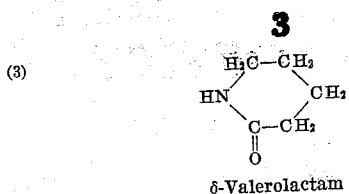
δ-Valerolactam (4) 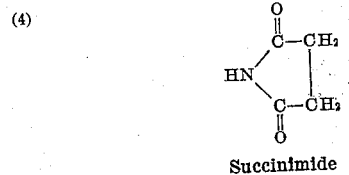
Succinimide (5) 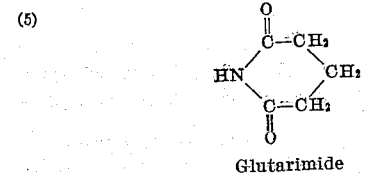
Glutarimide (6) 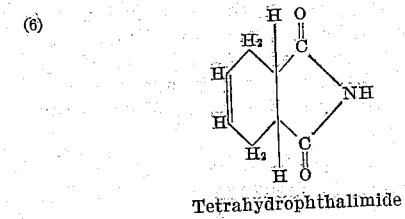
Tetrahydrophthalimide All of the foregoing starting materials are well known to those skilled in this art and hence their sources or methods of preparation need not be mentioned herein.

In practicing the invention, a gram mol of each of formaldehyde or paraformaldehyde, nitrobenzene or the substituted product thereof having at least one unoccupied position meta to the nitro group, α-mono- or α,α'-diketo-pyrrolidine, -piperidine, or tetrahydrophthalimide are dissolved in a sufficient quantity of concentrated sulfuric acid at a temperature ranging from 10–30° C. to give a solution of the reactants. The solution is allowed to stand at room temperature, preferably with stirring, for a period of time ranging from 12 to 24 hours. It is then heated to 45° C. for a period of 3 to 6 hours, and thereafter heated to 65° C. overnight, i. e., for about 10 to 15 hours. The reaction mixture is then poured over ice, and the product washed several times with water and recrystallized in any appropriate common solvent such as benzene, carbon tetrachloride, and the like. The resulting product may be reduced to the amine in the usual manner to yield dyestuff intermediates.

The invention will be more fully described in conjunction with the following specific examples. It is to be understood, however, that the examples are given by way of illustration only and that the invention is not to be limited by the details set forth therein.

*Example I*

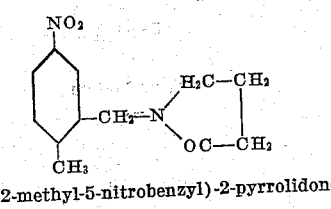
1-(2-methyl-5-nitrobenzyl)-2-pyrrolidone 274 grams of p-nitrotoluene, 60 grams of paraformaldehyde, and 170 grams of γ-butyrolactam were dissolved in 600 mls. of concentrated sulfuric acid at 20° C. and the solution allowed to stand at room temperature for approximately 12 to 15 hours, then at 45° C. for 6 hours, and 65° C. for 12 hours. The solution was then poured over ice and the oily product washed with water until free of acid. The washed oil was then taken up in carbon tetrachloride in which it is completely soluble. On cooling of the carbon tetrachloride solution, white crystals which deposited were filtered off. The yield of the product was 174 grams with a melting point of 94–96° C.

The crystallized product was analyzed and the following figures obtained:

ANALYSIS for $C_{12}H_{14}N_2O_3$

| | Calculated | Found |
|---|---|---|
| C | 61.52 | 61.35 |
| H | 6.02 | 5.89 |
| N | 11.96 | 11.90 |

*Example II*

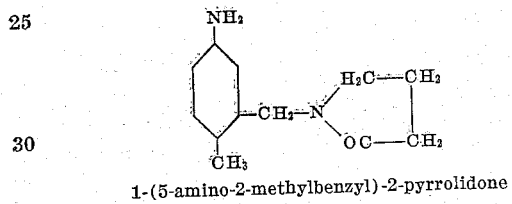
1-(5-amino-2-methylbenzyl)-2-pyrrolidone

The product of Example I was hydrogenated in the presence of Raney nickel as catalyst and worked up in the usual manner. The product is crystalline and extremely soluble in all common solvents except petroleum ether, ethyl and isopropyl ether. It was crystallized from isopropanol and the product dehydrated by codistillation of the water with benzene and recovered by distillation of the benzene.

*Example III*

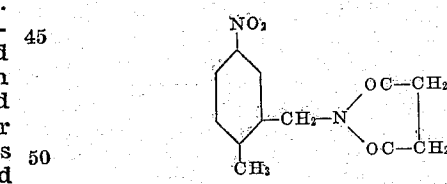
N-(2-methyl-5-nitrobenzyl)succinimide

Example I was repeated with the exception that 170 grams of γ-butyrolactam were replaced by 198 grams of succinimide. The solution after heating to 65° C. overnight and poured over ice yielded a gummy precipitate which slowly became granular. The precipitate was filtered, washed with water until acid free, and then dried. The yield of the crude product was 402 grams or 81% with a melting point of 109–116° C. The product may be crystallized satisfactorily from carbon tetrachloride or benzene. When pure, it melts at 124–125° C.

The analytical sample was crystallized from benzene and the following figures obtained:

ANALYSIS FOR $C_{12}H_{12}N_2O_4$

| | Calculated | Found |
|---|---|---|
| C | 58.06 | 57.95 |
| H | 4.87 | 5.05 |
| N | 11.29 | 11.12 |

Example IV

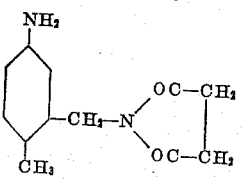

N-(5-amino-2-methylbenzyl)succinimide

The product of Example III was hydrogenated in the presence of Raney nickel as catalyst and worked up in the usual manner. The product crystallized from the methanol which was used as the hydrogenation solvent. It was dissolved by heating and the addition of methanol and filtered from the catalyst. On cooling, 167 grams (79%) of the product which melted at 165–167° C. crystallized. A small sample was again recrystallized and the following analytical figures obtained:

ANALYSIS FOR $C_{12}H_{14}N_2O_2$

|   | Calculated | Found |
|---|---|---|
| C | 66.03 | 65.80 |
| H | 6.47 | 6.58 |
| N | 12.84 | 12.99 |

Example V

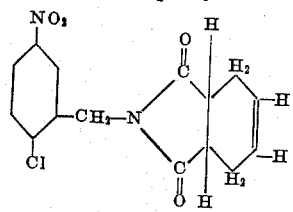

N-(2-chloro-5-nitrobenzyl)tetrahydrophthalimide

Example I was repeated with the exception that the nitrotoluene was replaced by 315 grams of p-nitrochlorobenzene and the γ-butyrolactam was replaced by tetrahydrophthalimide. After heating to 65° C. overnight, the solution was then poured over ice and the precipitate filtered off. The yield of the product was 480 grams.

Example VI

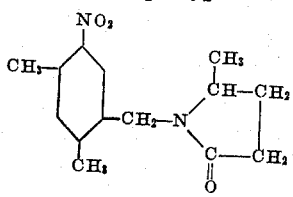

N-(2,4-dimethyl-5-nitrobenzyl)-γ-valerolactam

Example I was repeated with the exception that the nitrotoluene was replaced by 302 grams of 4-nitro-1,3-xylene and the γ-butyrolactam was replaced by 198 grams of γ-valerolactam. After heating and drowning in ice as described in Example I, there were obtained 216 grams of the product.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claims.

I claim:
1. The process which comprises heating, in the presence of sulfuric acid, an aliphatic aldehyde selected from the class consisting of formaldehyde and paraformaldehyde with a nitrobenzene compound selected from the class consisting of nitrobenzene, mono- and di-halogenated nitrobenzenes, lower alkyl substituted nitrobenzenes, and lower alkoxy substituted nitrobenzenes having at least one unoccupied position meta to the nitro group, and with a member selected from the class consisting of α-monoketopyrrolidine, α,α'-diketopyrrolidine, α-methyl-α'-monoketopyrrolidine, α-monoketopiperidine, α,α'-diketopiperidine, and tetrahydrophthalimide, said heating is first conducted at a temperature up to 45° C. for a period of time ranging from 3 to 6 hours and thereafter to 65° C. for a period of time ranging from 10 to 15 hours.

2. The process which comprises condensing, in the presence of sulfuric acid, 1 mol of each of p-nitrotoluene, paraformaldehyde, and γ-butyrolactam at a temperature up to 45° C. for a period of 3 to 6 hours and thereafter to 65° C. for a period of 10 to 15 hours.

3. The process which comprises condensing, in the presence of sulfuric acid, 1 mol of each of p-nitrotoluene, paraformaldehyde, and succinimide at a temperature up to 45° C. for a period of 3 to 6 hours and thereafter to 65° C. for a period of 10 to 15 hours.

4. The process which comprises condensing, in the presence of sulfuric acid, 1 mol of each of p-chloronitrobenzene, paraformaldehyde, and tetrahydrophthalimide at a temperature up to 45° C. for a period of 3 to 6 hours and thereafter to 65° C. for a period of 10 to 15 hours.

5. The process which comprises condensing, in the presence of sulfuric acid, 1 mol of each of 1,3-dimethyl-4-nitrobenzene, paraformaldehyde, and γ-valerolactam at a temperature up to 45° C. for a period of 3 to 6 hours and thereafter to 65° C. for a period of 10 to 15 hours.

SAUL R. BUC.

References Cited in the file of this patent

Chemical Abstracts, vol. 18, p. 1484b citing Jaenisch, Berichte, 56B, pp. 448–50 (1923).

Chemical Abstracts, vol. 29, p. 3678[9] citing Späth, Berichte, 68B, pp. 497–501 (1935).

Chemical Abstracts, vol. 29, p. 4365[1] citing Hanford, J. A. C. S., 57, 921–4 (1935).

Mater, Fiat Final Report No. 853, August 2, 1946 (2 pages), pp. 1 and 2.

Yang, Journal Organic Chemistry, vol. 10, (January 1945), pp. 67–68.